US011880379B1

(12) United States Patent
Newman et al.

(10) Patent No.: US 11,880,379 B1
(45) Date of Patent: Jan. 23, 2024

(54) IDENTITY RESOLUTION IN KNOWLEDGE GRAPH DATABASES

(71) Applicant: Wells Fargo Bank, N.A., San Francisco, CA (US)

(72) Inventors: David Newman, Walnut Creek, CA (US); Omar B. Khan, Richmond, VA (US); Nikolai Anisimov, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/661,158

(22) Filed: Apr. 28, 2022

(51) Int. Cl.
  *G06F 16/00* (2019.01)
  *G06F 16/248* (2019.01)
  *G06F 16/25* (2019.01)

(52) U.S. Cl.
  CPC .......... *G06F 16/248* (2019.01); *G06F 16/258* (2019.01)

(58) Field of Classification Search
  CPC .............................. G06F 16/248; G06F 16/258
  USPC .................................................. 707/600–899
  See application file for complete search history.

(56) References Cited

U.S. PATENT DOCUMENTS

| 7,630,978 | B2 | 12/2009 | Li et al. |
| 7,840,577 | B2 | 11/2010 | Ortega et al. |
| 9,189,742 | B2 | 11/2015 | London |
| 9,535,902 | B1 | 1/2017 | Michalak et al. |
| 9,766,983 | B2 | 9/2017 | Reddy et al. |
| 9,779,147 | B1 | 10/2017 | Sherman et al. |
| 10,348,658 | B2 | 7/2019 | Rodriguez et al. |
| 10,628,490 | B2 | 4/2020 | Yakout et al. |
| 10,733,619 | B1 | 8/2020 | Newman |
| 10,740,541 | B2 | 8/2020 | Zambre et al. |
| 10,762,118 | B2 | 9/2020 | Tripathi et al. |
| 10,769,142 | B2 | 9/2020 | Chen |
| 10,936,969 | B2 | 3/2021 | Patel et al. |

(Continued)

FOREIGN PATENT DOCUMENTS

| WO | WO-2019172849 A1 | 9/2019 |
| WO | WO-2020162884 A1 | 8/2020 |

OTHER PUBLICATIONS

"U.S. Appl. No. 16/230,879, Advisory Action dated Sep. 27, 2021", 3 pgs.

(Continued)

*Primary Examiner* — Michelle N Owyang
(74) *Attorney, Agent, or Firm* — SCHWEGMAN LUNDBERG & WOESSNER, P.A.

(57) ABSTRACT

A method may include presenting a user interface on a computing device, the user interface including: an input element configured to receive an input of a search concept; a similar concept selection element; and a concept comparison portion; executing a similarity search in a vector-space representation of a knowledge graph using the input; populating the similar concept selection element with a set of a similar concepts based on a result of the executed similarity search; receiving a selection of a comparison concept of the set of similar concepts from the similar concept selection element; generating a predicate comparison visualization in the concept comparison portion based on predicates in the knowledge graph of the comparison concept and the search concept; and presenting the predicate comparison visualization in the concept comparison portion.

17 Claims, 6 Drawing Sheets

(56) References Cited

U.S. PATENT DOCUMENTS

| | | | |
|---|---|---|---|
| 10,951,763 B2 | 3/2021 | Copeland | |
| 11,436,270 B2* | 9/2022 | Skupin | G06F 16/367 |
| 2011/0307819 A1* | 12/2011 | Vadlamani | G06F 16/951 |
| | | | 707/706 |
| 2014/0358906 A1 | 12/2014 | Behzadi et al. | |
| 2015/0178273 A1* | 6/2015 | Hakkani-Tur | G06F 40/40 |
| | | | 704/9 |
| 2016/0027197 A1 | 1/2016 | Beckett et al. | |
| 2017/0161619 A1* | 6/2017 | Franceschini | G06N 5/022 |
| 2017/0228372 A1* | 8/2017 | Moreno | G06F 16/24522 |
| 2018/0129369 A1 | 5/2018 | Kim et al. | |
| 2018/0150759 A1* | 5/2018 | Nitta | G06N 5/046 |
| 2018/0300409 A9 | 10/2018 | Dingwall et al. | |
| 2019/0179917 A1 | 6/2019 | Agrawal et al. | |
| 2019/0205475 A1* | 7/2019 | Ulfelder, Jr. | G06F 16/3334 |
| 2019/0236460 A1* | 8/2019 | Jagota | G06N 5/025 |
| 2020/0117857 A1 | 4/2020 | Gnanasambandam et al. | |
| 2020/0151392 A1 | 5/2020 | Crabtree et al. | |
| 2020/0242140 A1 | 7/2020 | Xu et al. | |
| 2020/0272662 A1 | 8/2020 | Markovic et al. | |
| 2020/0322361 A1 | 10/2020 | Ravindra et al. | |
| 2020/0349324 A1 | 11/2020 | Ostby et al. | |
| 2020/0401593 A1 | 12/2020 | Panuganty et al. | |
| 2021/0279420 A1 | 9/2021 | Jain et al. | |
| 2023/0081891 A1* | 3/2023 | Kulkarni | G06N 5/022 |

OTHER PUBLICATIONS

"U.S. Appl. No. 16/230,879, Final Office Action dated Jul. 7, 2021".

"U.S. Appl. No. 16/230,879, Non Final Office Action dated Jan. 7, 2021".

"U.S. Appl. No. 16/230,879, Non Final Office Action dated Dec. 9, 2021".

"U.S. Appl. No. 16/230,879, Response filed Apr. 5, 2021 to Non Final Office Action dated Jan. 7, 2021", 9 pgs.

"U.S. Appl. No. 16/230,879, Response filed Sep. 7, 2021 to Final Office Action dated Jul. 7, 2021", 8 pgs.

"U.S. Appl. No. 17/646,228, 312 Amendment filed Jun. 12, 2023", 8 pgs.

"U.S. Appl. No. 17/646,228, Corrected Notice of Allowability dated May 16, 2023", 2 pgs.

"U.S. Appl. No. 17/646,228, Notice of Allowance dated May 4, 2023", 14 pgs.

"U.S. Appl. No. 17/646,228, PTO Response to Rule 312 Communication dated Jul. 28, 2023", 2 pgs.

Racz, Gabor, et al., "Visualization of Semantic Data Based on Selected Predicates", Part of the Lecture Notes in Computer Science book series (LNCS, vol. 8615), (Aug. 17, 2014), 22 pgs.

* cited by examiner

IDENTITY RESOLUTION IN KNOWLEDGE GRAPH DATABASES

CROSS-REFERENCE TO RELATED APPLICATIONS

This patent application relates to U.S. patent application Ser. No. 16/230,879, titled "USER INTERFACES FOR DATABASE VISUALIZATIONS," filed on Dec. 21, 2018; U.S. patent application Ser. No. 17/646,219, titled "MACHINE LEARNING USING KNOWLEDGE GRAPHS," filed on Dec. 28, 2021; and U.S. patent application Ser. No. 17/646,228, titled "SEMANTIC ENTITY SEARCH USING VECTOR SPACE," filed on Dec. 28, 2021, each of which are incorporated by reference in their entirety.

BACKGROUND

Large sets of data become inherently difficult to visualize and search unless a user already knows a label or name of what they're looking for with the data. For example, business often have multiple data stores that are maintained by different employees or third-party vendors. Each of these data stores may use different schemas or different storage architectures such as relational databases, flat file databases, etc.

Accordingly, consider a user that wishes to find a profile of customer, server performance data, or is trying to find information on a business entity that is stored in one of the databases. The results may be spread across multiple data stores, which all use different identifiers and different formats for the data. Without the user knowing ahead of time where this data is, or how it is formatted, any search result may be incomplete. A related problem may occur with duplicate entries made in data stores for the same entity but that are unable to be detected because of the different naming or formatting methodologies used by a specific data store. Furthermore, there may be entities that appear to be the same based on having similar names but are in actuality different.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
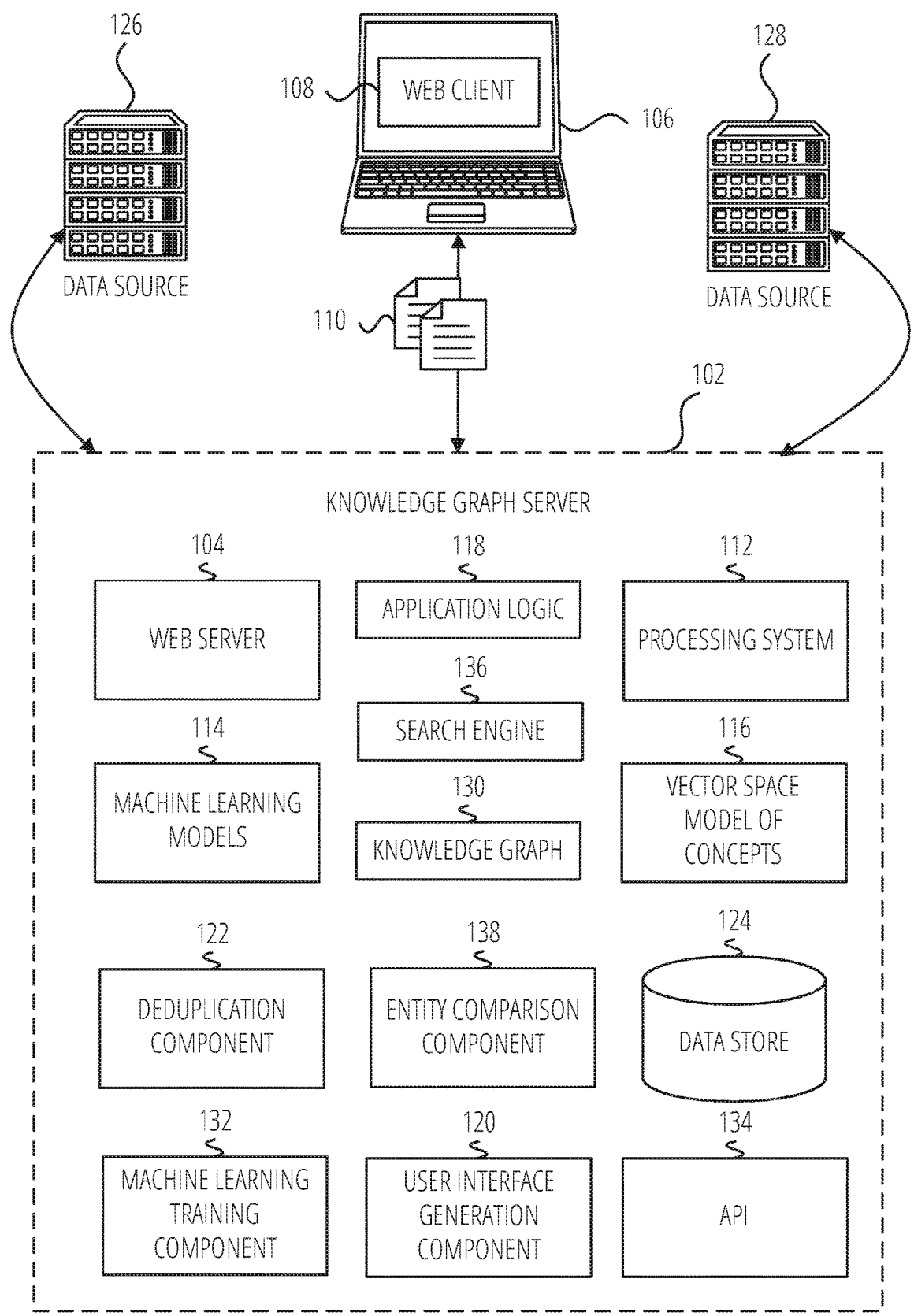
FIG. 1 is a diagram illustrating a schematic representation of components of a knowledge graph server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.), As a matter of convenience, this disclosure does not always detail where the variables are stored or how they are retrieved, In such instances, it may be assumed that the variables are stored on a storage device (e.g., Random Access Memory (RAM), cache, hard drive) accessible by the component via an Application Programming interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements, Although in some examples these portions may be displayed on a screen at the same time, in other examples the portions/elements may be displayed on separate screens such that not all of the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database As discussed herein, any large organization that uses a relational database management system (RDBMS) will quickly come to find that running any type of data analysis becomes unwieldy or incomplete. This challenge becomes more difficult as the database system grows and/or the amount of data increases. One possible solution to this problem is to create a data model before any data is inputted into a database. However, this is an impractical solution for existing systems as legacy data would not necessarily conform to the data model. For example, it is likely that not all users (e.g., database administrators, data scientists, data modelers, etc.) within an organization will use agreed-to terminology for the data model in the future.

An additional problem with traditional data repositories, in general, is that incorrect or duplicate entries can be difficult or impossible to detect and/or correct. For example, a lot of the data that is put into a data repository is manually entered and comes from different sources. For example, consider a database that maintains a list of companies, their addresses, and their phone numbers. One data entry may be for "Bob's Auto Body" at "123 Main St." and another for "Bobs Auto Body Shop" at "123 Main Street," This often occurs during an onboarding or data entry process when two entries with different identifiers end up getting created because the underlying data does not match exactly—even though it is likely the entities are the same.

As such, maintaining the two entities can create a number of problems. First, data repositories are not "free" in the sense that they consume resources and have a storage capacity. Thus, duplicate entries consume disk space and require additional time to complete queries (due to the need to search more data). Second, data analytics executed for the data repository will be inaccurate. For example, if a data scientist queries the data repository for the total number of businesses, the count will be wrong. Similarly, if the data scientist queries the data repository for the total number of "auto" businesses, the number of results will be wrong. Finally, if a user is searching for a specific autobody shop entity, they may not know which of the "auto" results is correct or not be aware that they are the same entity.

Another type of data repository is a graph database—often used with a semantic ontology. A semantic ontology may be a taxonomy of concepts for a given field—different fields may use different ontologies. The ontology may identify types (e.g., concept objects), properties, and inter-relationships between the objects. In some examples, the definition of an ontology is described and stored as a schema at a network-accessible uniform resource identifier (URI).

A graph database may be used for storing a representation of an ontology. Nodes of the database may represent objects, edges may connect the nodes to indicate a relationship, and predicates (also referred to as properties herein) may indicate information about the edges and nodes. A triplestore (sometimes referred to a resource description framework (RDF) store) is a type of graph database often used for semantic data that conforms to the subject-predicate (or property)-object format, As an example, consider a schema for a Person object. The schema may include a number of entries that define the properties (sometimes referred to as relationships, slot-value types) of a Person object such as "given name," "height," "weight," etc., and the properties may also have expected types. Thus, the "height" property may have a value-type of a number whereas "given name" has a string value type. The expected type of an object may be another object. For example, a property of "knows" may have an expected type of Person. Accordingly, the data string "Alice knows Bob" can be thought of as two Person objects with the Alice having the "knows" property. In another example, a Business object may have properties of an address, a legal name, and a phone number.

Another way to consider ontologies is using a "Subject, Predicate, Object" (S-P-O) format. Using the example of "Alice knows Bob," Alice is the subject, the predicate is "knows," and the object is "Bob." With reference back to the example Person schema, the predicate is the property in the schema and the expected type is the object. In other words, a schema may semantically define valid relationships between multiple objects.

A user may search for objects in an ontology or for the schema of the ontology itself. For example, a user may search for "Person" to retrieve the Person object and have the properties of the Person object presented. The Person object may also have a parent object and child objects. An ontology may be structured as a directed acyclic graph and stored in a graph database. Each node in the directed acyclic graph may represent a concept object in the ontology. A concept object may have a "is a" direct property relationship to one or more other concept objects that are represented as vertices in the directed acyclic graph. If concept object B "is a" concept object A, then concept object B may be considered a subclass of concept object B. Similarly, concept object A may be a superclass concept object of concept object B. The relationships and concept objects may be stored in a graph database. Properties from a superclass of a concept object may be inherited to the concept object.

A concept object may also be semantically related to other concept objects or attributes. Unlike direct "is a" relationship, semantically related objects do not automatically inherit properties from their semantic links. For example, a Person object may have a property of "works for" a Company object, but the Person object may not inherit properties of the Company object.

Searching for a particular type of data within an organization has its own challenges—even when the data is available. One challenge is to effectively help find what a user is looking for. A second challenge is helping to enable the user to understand the results.

The ability to quickly and accurately present relationships among data elements is not just an inconvenience. For example, consider a user that is searching for relationships between entities to evaluate security or regulatory risk. Although some advanced data scientists may have the technical ability to formulate complex database search queries, it is not often these data scientists that are evaluating the risk. Instead, it is often users without this level of technical acumen that are searching for information. Therefore, without a system that can aggregate data from multiple data sources, efficiently search the data, and present the information in a coherent manner, these less technical users may be making decisions based on incomplete or inaccurate information. Additionally, the requirement of searching multiple databases is a computationally expensive task in terms of time and processing power.

In various examples, the system described herein includes multiple improvements to data storage and data searching to address the above deficiencies. For example, as discussed in more detail below, the system may aggregate data in a variety of formats and transform it to fit a common semantic ontology in a resource description framework (RDF) format as a knowledge graph database. The graph database may then be leveraged to create a low-dimensional vector space representation of entities in the graph database. Furthermore, the vector space representation enables fast finding of similar entities to determine whether the entities are the same and should be merged—further increasing the speed of search and reducing storage requirements.

FIG. 1 is a diagram illustrating a schematic representation of components of a knowledge graph server 102, according to various examples. The system comprises a knowledge graph server 102, a web server 104, a client device 106, a web client 108, a data 110, a processing system 112, a machine learning models 114, a vector space model of concepts 116, an application logic 118, a user interface generation component 120, a deduplication component 122, a data store 124, a data source 126, a data source 128, a knowledge graph 130, a machine learning training component 132, an API 134, a search engine 136, and an entity comparison component 138.

For illustration purposes, knowledge graph server 102 is illustrated as set of separate items (e.g., web server 104, vector space model of concepts 116, etc.). However, the functionality of an individual item may be performed by a single component. A component may represent computer program code that is executable by a processing unit (e.g., a core of a general-purpose computer processor, a graphical processing unit, an application specific integrated circuit, etc.) of processing system 112. The program code may be stored on a storage device and loaded into a memory of the processing unit for execution. Portions of the program code may be executed in a parallel across multiple processing units. Execution of the code may be performed on a single device or distributed across multiple devices. In some examples, the program code is executed on a cloud platform (e.g., MICROSOFT AZURE® and AMAZON EC2®) using shared computing infrastructure.

Knowledge graph server 102 may be used to implement the processes described in this disclosure. An overview of each of the components is provided in the context of this figure. Additional detail is provided during the discussion of the remaining figures.

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 106 and knowledge graph server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Client device 106 and knowledge graph server 102 may communicate data 110 over the network. Data 110 may include a search request from a user for a particular concept in knowledge graph 130 or a comparison search between two concepts. Data 110 may also include the results of the search for rendering on web client 108.

In some examples, the communication may occur using an application programming interface (API) such as user interface generation component 120. An API provides a method for computing processes to exchange data. A web-based API (e.g., API 134 may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 124).

Knowledge graph server 102 may include web server 104 to enable data exchanges with client device 106 via web client 108. Although generally discussed in the context of delivering webpages via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Figure 2:
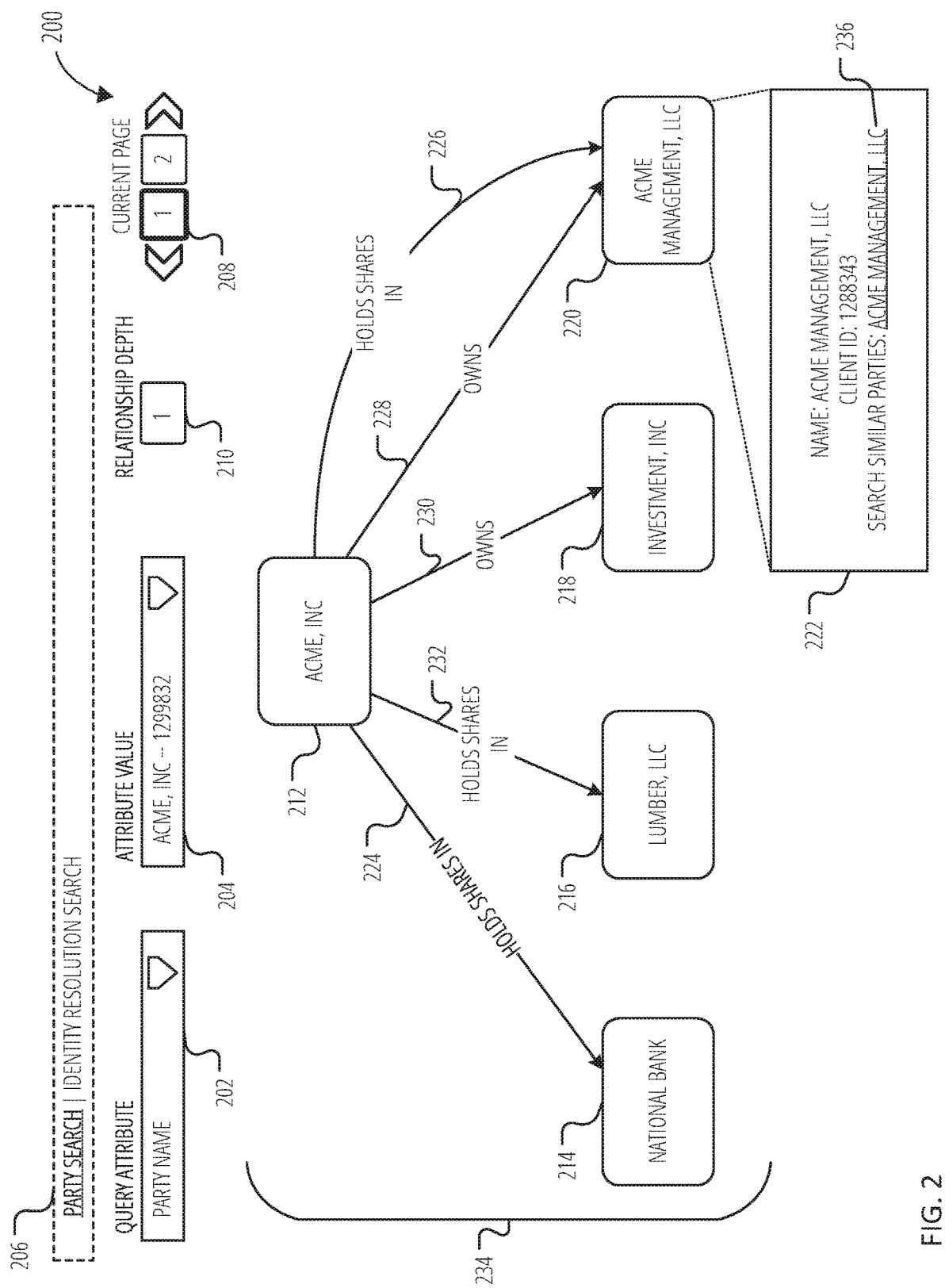
FIG. 2 is a user interface for searching a knowledge graph data model, according to various examples.
Figure 3:
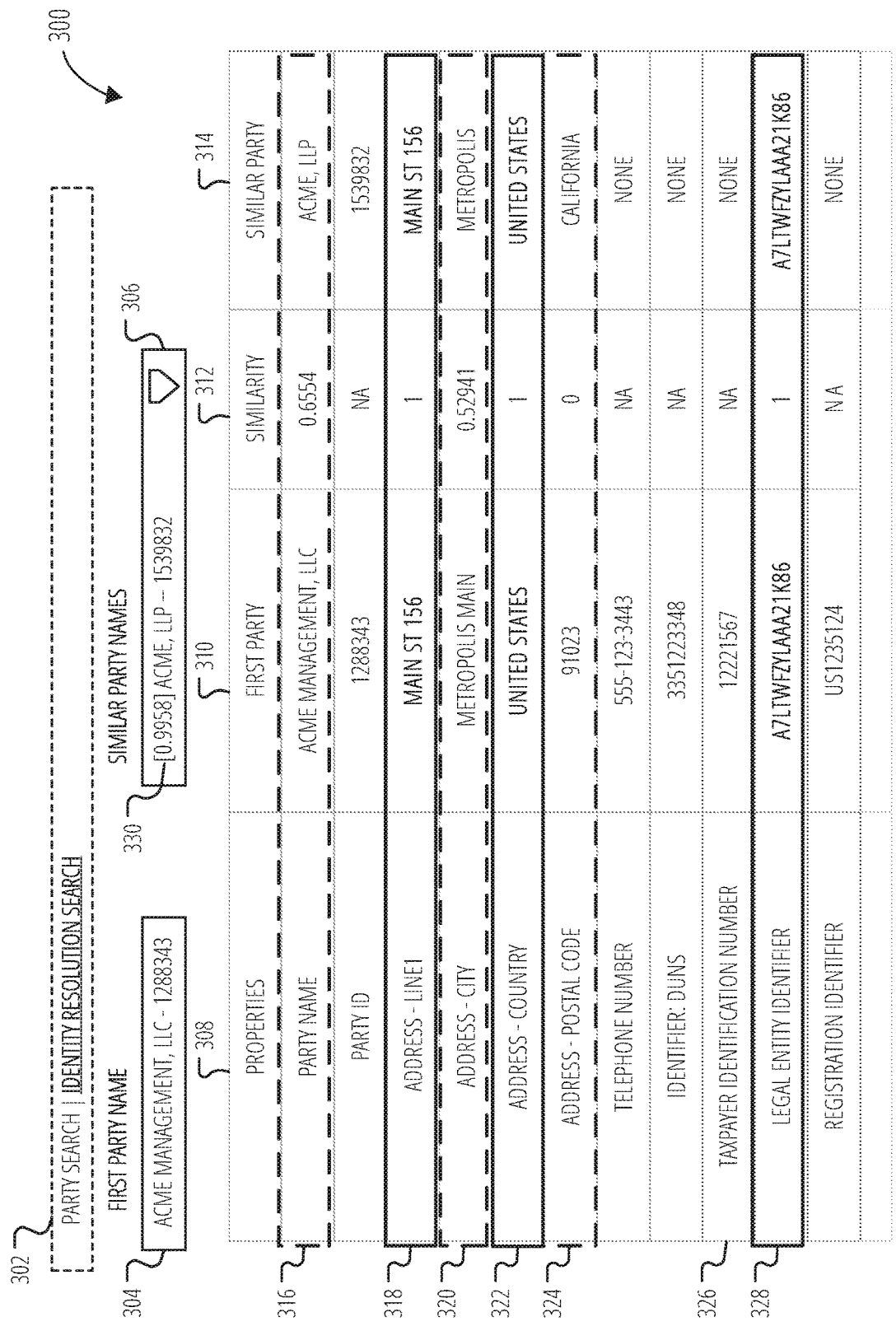
FIG. 3 illustrates a user interface for comparing two objects in a table format, according to various examples.
Figure 4:
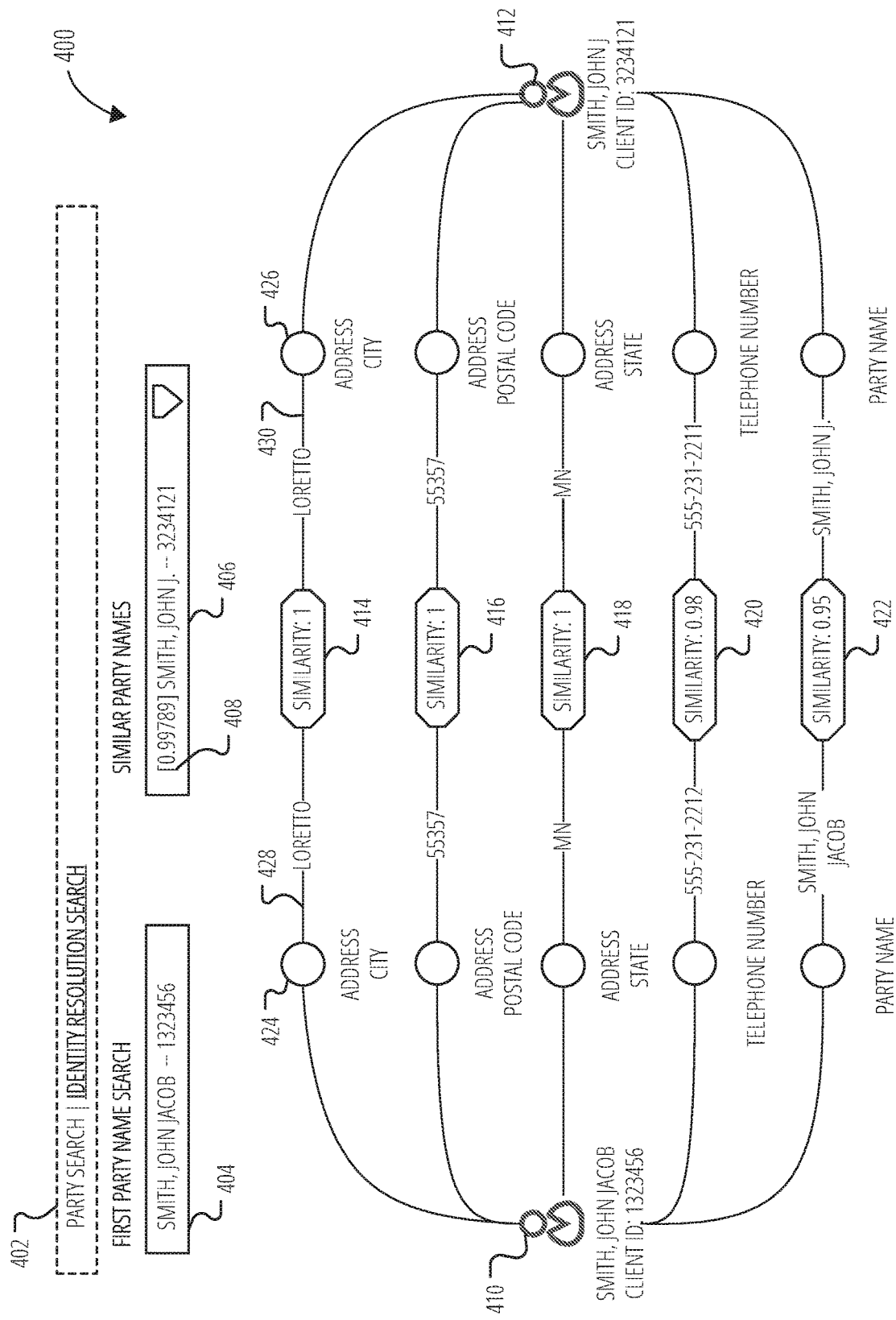
FIG. 4 illustrates a user interface for comparing two objects in a graph representation format, according to various examples.

Additionally, web server 104 may enable a user to interact with one or more web applications provided in a transmitted web page. A web application may provide user interface (UI) components that are rendered on a display device of client device 106. The user may interact (e.g., select, move, enter text into) with the UI components, and based on the interaction, the web application may update one or more portions of the web page. A web application may be executed in whole, or in part, locally on client device 106. The web application may populate the UI components with data from external sources or internal sources (e.g., data store 124) in various examples. For example, a web application may be used to search and explorer knowledge graph 130 as depicted in FIG. 2, FIG. 3, and FIG. 4.

The web application may be executed according to application logic 118. Application logic 118 may use the various elements of knowledge graph server 102 to implement the web application. For example, application logic 118 may issue API calls to retrieve or store data from data store 124 and transmit it for display on client device 106. Similarly, data entered by a user into a UI component may be transmitted using user interface generation component 120 back to web server 104. Application logic 118 may use other elements (e.g., machine learning models 114, vector space model of concepts 116, application logic 118, user interface generation component 120, etc.) of knowledge graph server 102 to perform functionality associated with the web application as described further herein.

Data store 124 may store data that is used by knowledge graph server 102. For example, knowledge graph 130 may be stored in data store 124 as a graph database (e.g., using Neo4j). Data store 124 is depicted as a singular element but may be multiple data stores. The specific storage layout and model used in by data store 124 may take a number of forms—indeed, a data store 124 may utilize multiple models. Data store 124 may be, but is not limited to, a relational database (e.g., SQL), non-relational database (NoSQL) a flat file database, object model, document details model, graph database, shared ledger (e.g., blockchain), or a file system hierarchy. Data store 124 may store data on one or more storage devices (e.g., a hard disk, random access memory (RAM), etc.). The storage devices may be in standalone arrays, part of one or more servers, and may be located in one or more geographic areas.

Machine learning models 114 may include one or more machine learning models used by knowledge graph server 102 to determine search results for a user query. In some instances, the machine learning model itself is directly used but instead, the weights of the hidden layers are the basis for the coordinates in vector space model of vector space model of concepts 116.

For example, a machine learning model (e.g., a semantic model) may be trained to find synonyms of concepts using the metadata of the concepts in the knowledge graph 130. A corpus of training data may be compiled by obtaining, for each concept object in an ontology, a concept label and annotations describing the concept object. A vocabulary of terms is generated based on the corpus of training data. For example, each unique word in the corpus of training data may be a term. In some examples, each concept label from the ontology is a term. In some examples, some words may be excluded from the vocabulary (e.g., "and"). The vocabulary may be generated according to an algorithm defined by a natural language processing algorithm or semantic model.

A semantic model is trained using the corpus of training data and the vocabulary of terms. The semantic model may be, but is not limited to, Word2Vec, GloVe, fastText, and conceptnumberbatch. Input features of the semantic model may be based on context words in proximity to a term in the vocabulary of terms. The limit of proximity may be defined according to a window of X words surrounding the term. Context may refer to word within the window. The format and number of input features may be defined as a parameter of the semantic model.

Training the semantic model may include using word pairs from the corpus of training data (e.g., using continuous bag of words or skip-gram), a first word of a word pair being an input and a second word of the word pair being an expected output. In various examples, each respective row of the weight matrix between the input layer and the single hidden layer of neurons is a respective word embedding of the set of word embeddings for a respective term in the vocabulary of terms.

A set of word embeddings for the vocabulary of terms is stored based on the trained semantic model. For example, each row of the weight matrix may be stored as a word embedding for the vocabulary of terms. An API may be defined that permits querying the stored word embedding for the closest term in the vocabulary given an input term. Closeness may be defined by the cosine similarity between two different word embeddings. The semantic model may be used to suggest alternate search terms to the user if a search string is not a direct match for a concept name.

Another machine learning model may be used to determine if two objects are actually duplicates, or share common data, of each other. The machine learning model may take as input knowledge graphs that were generated from data sources (e.g., data source 126 and data source 128) and use a similarity algorithm (e.g., PyTorch-BigGraph). The result of the training (e.g., the weights of the nodes) may be coordinates for each concept (as identified by a unique identifier) in vector space that are stored in vector space model of vector space model of concepts 116. When a user searches for one concept using client device 106, knowledge graph server 102 may retrieve other concepts that are close in vector space (e.g., using cosign similarity) to the searched for concept.

In various examples, user interface generation component 120 may be include an interface to search engine 136. A user may search for a concept, such as an entity (e.g., business, person, etc.) name, in knowledge graph 130. Search engine 136 (e.g., using a database management system such as Neo4j) may respond with one or more result concepts that match the search query of the user. Upon selection of a result concept, search engine 136 may execute a search to find a set of comparison concepts that are closest to the result concept in vector space according to vector space model of concepts 116. The user may then select a comparison concept. Upon receiving a selection of the comparison concept, entity comparison component 138 may generate and present a visualization that compares predicate values of the two concepts. A more detailed walkthrough of the above search methodology is presented in the remaining figures.

FIG. 2 is a user interface 200 for searching a knowledge graph data model, according to various examples. The user interface 200 includes a query attribute selection element 202, an attribute value input element 204, a search type selection element 206, a graph page element 208, a graph depth element 210, a head node 212, an object node 214, an object node 216, an object node 218, an object node 220, a node detail element 222, an edge 224, an edge 226, an edge 228, an edge 230, an edge 232, a graph visualization 234, and a similar search link 236.

In various examples, a user may use a web browser to navigate to a web application that presents a user interface such as user interface 200. User interface 200 may be used to search for entities that have been stored in a knowledge graph database such as knowledge graph 130. Although a variety of search types may be used to search knowledge graph 130, user interface 200 includes two options presented in search type selection element 206. Search type selection element 206 includes a party search option and an identity resolution search option. The label "party search" is styled as bold and underlined, indicating the current search type is a party search.

In a party search type, attributes of the party may be selected for searching using query attribute selection element 202. The query attribute selection element 202 may be populated—as selectable by clicking the down arrow of query attribute selection element 202—with different attributes of the type of object being searched. For example, in the context of FIG. 2, businesses are the object. Therefore, attributes may include name, address, phone number, etc. The attributes may also be associated with the structure of knowledge graph 130. Thus, for a searchable attribute, a semantic sentence (subject, predicate, object: {"Business", "has a", "Name"}) may exist for the semantic ontology used by knowledge graph 130. FIG. 2 uses a business entity as a party, but this disclosure is not limited to business objects. For example, the party could be a person, an asset (e.g., database, server), or other object class in knowledge graph 130.

Query attribute selection element 202 is illustrated with the value of "party name"—signifying a search input of the party name attribute. A user may enter in a search string for the selected attribute in attribute value input element 204. Once a user enters in a search string a database query may be generated and executed (e.g., using search engine 136). For example, if "ACME" was the attribute value search string, a graph database query language such as SPARQL Protocol and RDF Query Language (SPARQL) may be used to retrieve all objects that have ACME as part of their party name. The results of the database query may be populated as selectable objects within attribute value input element 204. FIG. 2 already assumes that a search has been made and that the user has selected "ACME, INC." A user may select a different object by clicking on the down-arrow symbol of attribute value input element 204.

Upon receiving a selection of a result in attribute value input element 204, a subsequent SPARQL query may be made to retrieve other semantically linked objects related to the result object. Accordingly, the results of the subsequent query may include other businesses, people, etc., that are linked to the result object. In some examples, the query if formulated to limit the results to objects of the same class as the original query. Thus, as shown in FIG. 2, the only results are business-type objects.

The results of the query may be displayed as a hierarchical graph, in various examples, such as graph visualization 234. Other result types may include radial graphs or tables. The nodes of the graph may represent objects and the edges may be labeled with the relationship between the result objects.

For example, head node 212 is labeled as "ACME, INC" indicating the node that was selected as attribute value input element 204. Head node 212 is connected to object node 214, object node 216, object node 218, and object node 220 via edges 224, 232, 230, 228, and 226. Each edge has a label that corresponds to the predicate portion of knowledge graph 130. For example, edge 224 has a label "holds shares in" indicating a S-P-O triple of {Acme, Inc; holds shares in; National Bank}. If there is more than one connection between objects, multiple edges may be drawn and labeled. For example, edge 228 indicates that "Acme, Inc" owns "Acme Management, LLC", and edge 226 indicates that "Acme, Inc" holds shares in "Acme Management, LLC".

User interface 200 includes visualization preferences for graph visualization 234 in the form of graph depth element 210 and graph page element 208. Graph depth element 210 may be used to set how many depth levels of a graph, with respect to head node 212, should be retrieved and shown. For example, graph depth element 210 has a value of '1' indicating only objects that are within a distance of '1' should be shown in graph visualization 234. Distance may be defined as the number of edges that need to be traversed between nodes.

Accordingly, when the graph depth element 210 is set to a value of '2', an additional layer of nodes may be presented beneath object nodes 214, 216, 218, and 220. This additional layer of nodes may include additional objects that are semantically linked to object node 214 in knowledge graph 130, for example. Thus, an edge may be shown between object node 214 and an additional node of another business—with the edge being labeled according to the relationship (e.g., a predicate of "owns"). The use of a depth setting has the dual benefit of providing a better user interface to navigate a knowledge graph and reducing the computational power needed to present an entire graph if just a few depth levels are requested.

Paging may be used when a graph is too large to display—in a readable manner—all child nodes of a parent node. Within the context of graph visualization 234, head node 212 may be a parent node with object nodes 214, 216, 218, and 220 being child nodes. Each "page" may show a subset of the child nodes and a user may navigate (e.g., horizontally via graph page element 208) through the pages to see the non-displayed child nodes. The parent node may still be displayed in each page, but the user may traverse through the child nodes by using the navigation arrows of graph page element 208. When a user activates (e.g., clicks) one of the arrows, some or all of the current displayed child nodes may be replaced with currently non-displayed child nodes. The current page may be highlighted (e.g., by a color, underlining, etc.) in graph page element 208 to signify to a user what page they are currently viewing.

User interface 200 may include additional visualization controls. For example, a navigation control with zoom and arrows (up, left, right, down) may displayed to traverse a graph shown graph visualization 234. Other options may include toggles for hiding and displaying the edge labels, changing the style of edges (e.g., curved vs straight), among others.

A user may interact with one or more of the nodes presented in graph visualization 234. For example, a user may hover over object node 220 with a cursor to have node detail element 222 may be displayed. Within node detail element 222, values of the attributes of the hovered over node may be displayed. For example, within node detail element 222, the client ID and the name are displayed. For compactness, only two attributes are displayed, however more attributes may be displayed without departing from the scope of this disclosure such as taxpayer identifiers, addresses, telephone numbers, etc. The value of the attributes may be retrieved by execution of a SPARQL query to knowledge graph 130.

Further illustrated within node detail element 222 is similar search link 236. By activating the link (e.g., clicking using an input device) a user may be transitioned from user interface 200 to a user interface such as presented in FIG. 3.

FIG. 3 illustrates a user interface for comparing two objects in a table format, according to various examples. The user interface 300 comprises a search type selection element 302, a first party name element 304, a similar party name selection element 306, a property column 308, a first party value column 310, a similarity calculation column 312, a similar party value column 314, a party name row 316, an address line row 318, a city row 320, a country row 322, a postal code row 324, a taxpayer identification row 326, a legal entity identifier row 328, and a text embedding similarity value 330.

The user interface 300 may be presented to a user by activation of similar search link 236 from user interface 200 or by a user clicking within search type selection element 206. In the former case, first party name element 304 similar party name selection element 306 and may be pre-populated with values. For example, because similar search link 236 was for "Acme Management, LLC", first party name element 304 is labeled "Acme Management, LLC". Similarly, similar party name selection element 306 is populated with a list of entities that are similar to "Acme Management, LLC".

In the alternative scenario, a user arrives at user interface 300 directly or via a link from search type selection element 206. In this instance, first party name element 304 may be blank and function in a similar manner as a combination of query attribute selection element 202 and attribute value input element 204. For example, a user may enter in a search query and activate a search element (not shown) to initiate a search. The results of the search may be placed as selectable elements in first party name element 304 (similar to the populated attribute value input element 204).

The entries in similar party name selection element 306 may be determined by a similarity algorithm operating in vector space. For example, as discussed in more detail with above text/word embeddings may be used to determine the similarity between two concepts in vector space. Accordingly, a distance measurement (e.g., cosign similarity) may be used to determine how close or far apart two objects are in vector space. The objects may be represented by unique identifiers in vector space that correspond to a property of the object. For example, first party name element 304 indicates that the identifier of Acme Management, LLC is 1288343. The closer the objects are in vector space, the more similar they are. Vector space model of concepts 116 may include vector space representations of the parties in knowledge graph 130.

The number of party names listed in similar party name selection element 306 may be limited by the similarity value 330 (e.g., the cosign similarity value) for a given party. Thus, only those parties that have a similarity value of above 0.9 (or other set threshold) may be presented. In other examples, the number be limited to closest (in vector space) five, ten, etc. A user preference may be displayed that allows the user to select and modify the criteria for what parties are included in the results.

After a user has selected a similar party from the similar party name selection element 306, a table may be presented that illustrates values of properties of the party in first party name element 304, and the values of the properties for the selected similar party name. Although not illustrated, the table may include user interface control elements to change the width of a column, restrict the number of rows displayed, and filter/sort the columns according to their values. The presented table includes four columns: property column 308; first party value column 310; similarity calculation column 312; and similar party value column 314. Using an S-P-O format, the party's name is the subject, the property is the predicate, and the object is the value in knowledge graph 130. For example, with respect to legal entity identifier row 328, a triple in knowledge graph 130 may be, {"Acme Management, LLC; "has legal entities identifier", "A7LTWFZYLAAA21K86"}. The values in first party value column 310 and similar party value column 314 may be retrieved by SPARQL queries to knowledge graph 130.

The properties that are used in the table may reflect a subset of the types of predicates for the searched type of entity. For example, knowledge graph server 102 may analyze the most common predicates for a business object entity in knowledge graph 130. The most common 15 (or other threshold number) may be used for a similarity table such as presented in FIG. 3. In some examples, some predicates may be removed because they are not discriminative enough (e.g., 95% of all objects may have USA as a country).

The values in similarity calculation column 312 may be calculated by knowledge graph server 102 using entity comparison component 138. Different properties may have different similarity calculations. Data store 124 may store a lookup table that maps a property (or a class of properties) to a similarity algorithm.

For example, for party name row 316 a string similarity algorithm such as normalized Levenshtein Distance, Jaccard Similarity, Hamming Distance, or Longest Common Subsequence may be used. FIG. 3 indicates the result of the similarity algorithm is a value of 0.6554 at the intersection of party name row 316 and similarity calculation column 312. If either the first party or similar party does not a value for the property, the similarity value may be represented as NA (e.g., not available such as in taxpayer identification row 326).

Some properties—such as legal entity identifier in legal entity identifier row 328—may use an exact match calculation where a value of one (e.g., True) indicates every character of the identifier matches and a zero (e.g., False) if not. A modified exact match calculation may be used that considers the possibility of typos. For example, consider a first party's legal identifier is "A1233" and the similar party's legal identifier is "A1234." If a Levenshtein Distance result is one—indicating a single character is different, a similarity value of 0.9 (or other less than one value) may be used.

Additionally, a row or cell may be formatted according to the value of the similarity value. For example, dashed lines are placed around party name row 316, city row 320, and postal code row 324 that each have a value that is less than one. Extra weighted lines are illustrated around address line row 318, country row 322, and legal entity identifier row 328 that have a similarity value of one. Other types of formatting may be used without departing from the scope of this disclosure. For example, a graduated multi-color scheme may be used such that the closer the value is to one, the greener a row is, and the closer to zero, the redder the row appears.

Properties that are location-based—such as address line row 318, city row 320, country row 322, and postal code row 324—may use a combination of algorithms. For example, address line row 318 may use a modified Levenshtein Distance that considers replacements of abbreviations. Thus, "Main St" may be transformed to Main Street (or vice-versa) before the Levenshtein Distance is calculated. A similar method may be used when checking for a country (e.g., country row 322). As illustrated, the similarity value for postal code row 324 is a zero because the string 91023 is not the same the string California. However, in other examples, a more complex similarity algorithm may be used that takes into consideration that addresses are often entered incorrectly (e.g., a state may be placed in the zip code, etc.). Thus, entity comparison component 138 may lookup whether the zip code is in California. If so, a similarity value of a 0.5 (or other chosen value) may be used.

In various examples, properties may be grouped and given an overall similarity value. For example, the address properties indicated by the address rows in property column 308 may be treated as a single address entity. A standardized similarity value for the single address entity single property may be based on the distance (using geographic coordinates, for example) between the address of the first party and the similar party. Accordingly, the closer the two addresses are in geographic space, the closer to "one" the similarity value may be. A weighted distance may be used as well. For example, if the distance is more than 0.5 miles, the value may be zero. And with any distance between 0 and 0.5 miles, a standardized range between one and zero may be used.

FIG. 4 illustrates a user interface for comparing two objects in a graph representation format, according to various examples. The user interface 400 comprises a search type selection element 402, a first party name element 404, a similar party name selection element 406, a text embedding similarity value 408, a first party entity 410, a similar party entity 412, a city similarity value 414, a postal code similarity value 416, a state similarity value 418, a telephone number similarity value 420, a party name similarity value 422, a city node 424, a city node 426, a first party city edge 428, and a similar party city edge 430.

User interface 400 presents another visualization of similarity values between two parties. In the example of FIG. 4, the parties are people entities—in contrast to the business entities in FIG. 3. For readability, user interface 400 only presents five properties of a person entity, but more or fewer may be used without departing from the scope of this disclosure. Search type selection element 402, first party name element 404, text embedding similarity value 408, and similar party name selection element 406 may operate in a similar fashion as search type selection element 302, first party name element 304, text embedding similarity value 330, and similar party name selection element 306. Although not illustrated, a similarity visualization type user interface may be used to toggle between a table such as FIG. 3 and a graph as in FIG. 4.

Unlike the table form in FIG. 3, FIG. 4 illustrates a graph visualization. Accordingly, first party entity 410 and similar party entity 412 are nodes from knowledge graph 130. As a more complete example, consider how city similarity value 414, first party city edge 428, city similarity value 414, similar party city edge 430, and city node 426 relate to data stored within knowledge graph 130. As a first matter, city similarity value 414 is not stored within knowledge graph 130. Instead, city similarity value 414—and postal code similarity value 416, state similarity value 418, telephone number similarity value 420, and party name similarity value 422—may be calculated by entity comparison component 138 as discussed above with respect to FIG. 2.

Second, graph visualization 234 was a semantically related graph. Accordingly, the triples were generated from relationships between objects. The graph visualization in FIG. 4, however, explores values of properties of a subject itself. Thus, an S-P-O triple in knowledge graph 130 for first party entity 410 may be {"1323456", "has address city", "Loretto"}. Similarly, for similar party entity 412, a triple may be {"3234121", "has address city", "Loretto"}. The predicate portion of the triple may be represented as a node (e.g., city node 424 and city node 426). The object portion of the triple may be used as a label on an edge such as first party city edge 428 and similar party city edge 430.

In various examples, visualization controls may be presented with respect to FIG. 4. For example, the order (e.g., top-to-bottom) of the properties may be set according to the similarity values. In other examples, the orientation of the graph representation may be vertical such that first party entity 410 and similar party entity 412 are centered vertically as opposed to the illustrated horizontal alignment.

A user may interact with the nodes of FIG. 4 by clicking or hovering over a node. For example, a pop-up window may be displayed over first party entity 410 when a user clicks on the first party entity 410. The pop-up window may include options to switch to a party search interface such as presented in FIG. 2 that depicts the relationships between people objects using first party entity 410 as the head node.

Figure 5:
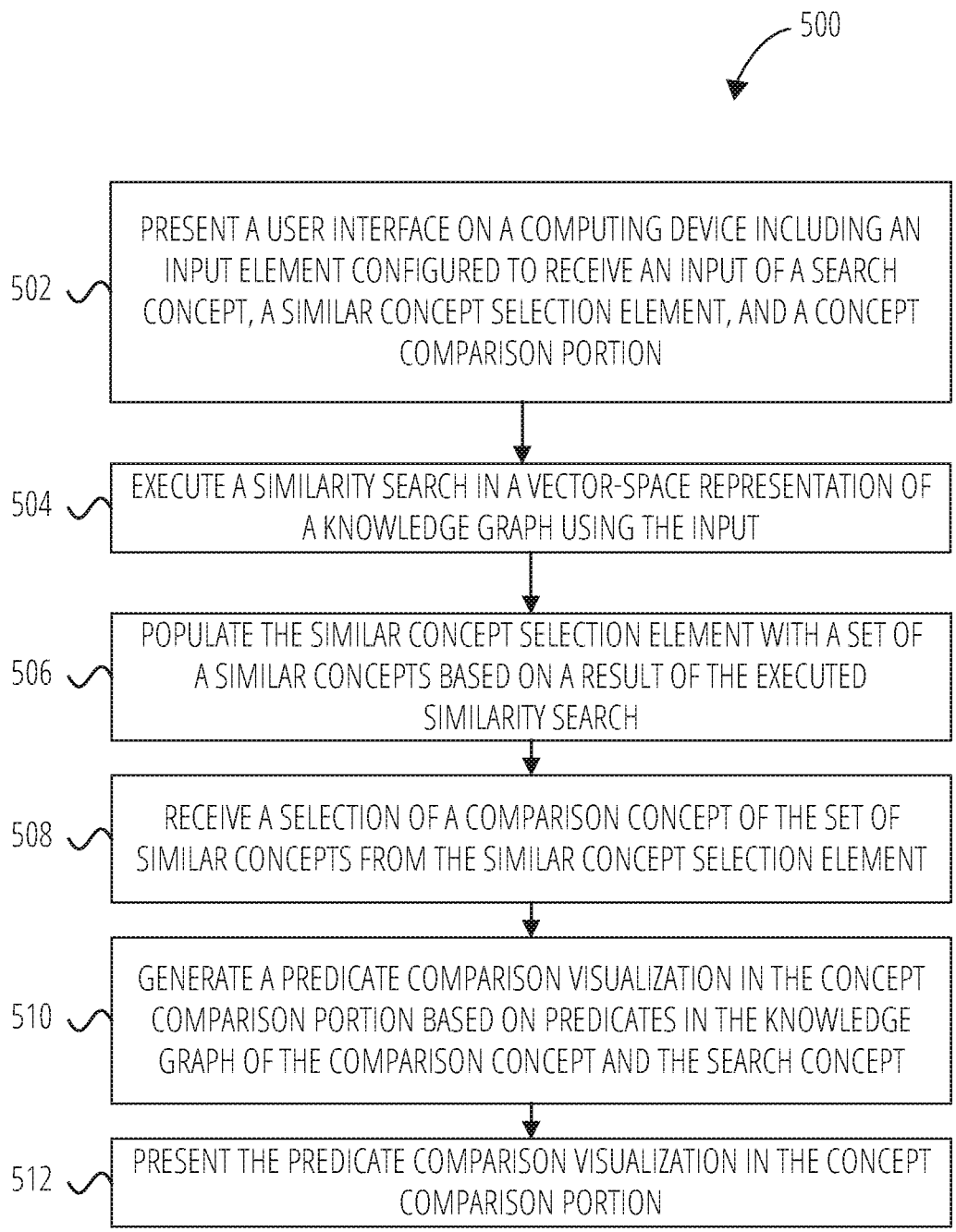
FIG. 5 illustrates a flowchart 500 in accordance with one embodiment.

FIG. 5 is a flowchart illustrating a method to compare objects in a knowledge graph, according to various examples. The method is represented as a set of blocks that describe operations 502 to 512 of flowchart 500. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure At operation 502, the method may include presenting a user interface on a computing device, the user interface including an input element configured to receive an input of a search concept, a similar concept selection element, and a concept comparison portion. For example, the user interface may be arranged as depicted in FIG. 3. The input element may include functionality as described with respect to first party name element 304 and the similar concept select element may include functionality as described with respect to similar party name selection element 306. The concept comparison portion may be a region of the user interface that displays similarity values of predicate values of the two concepts. The concepts may be an object type (e.g., a business, a server, a person, etc.). in knowledge graph 130, in various examples.

At operation 504, the method may include executing a similarity search in a vector-space representation of a knowledge graph using the input. The similarity search may use cosign similarity to determine the closest concepts (e.g., above 0.85) in vector-space to the input. The vector space representation may include coordinates for each entry in a knowledge graph based on a similarity algorithm such as PyTorch-BigGraph.

In operation 506, the method may include populating the similar concept selection element with a set of a similar concepts based on a result of the executed similarity search. For example, the closest concepts may placed in a drop-down menu with their respective degree of similarity (e.g., the cosign similarity value) displayed.

In operation 508, the method may include receiving a selection of a comparison concept of the set of similar concepts from the similar concept selection element. For example, a user may click on one of the similar concepts and active a presented "compare" user interface element. In some instances, a concept is considered selected upon a user selecting the concept in the drop-down menu without clicking on another user interface element.

In operation 510, the method may include generating a predicate comparison visualization in the concept comparison portion based on predicates in the knowledge graph of the comparison concept and the search concept. In operation 512, the method may include presenting the predicate comparison visualization in the concept comparison portion.

Operations 510 and 512 may be performed using the methodology described with respect to FIG. 3 and FIG. 4, in various examples. For example, generating the predicate comparison visualization in the concept comparison portion may include retrieving values of a subset of the predicates in the knowledge graph of the search concept and retrieving values of the subset of the predicates in the knowledge graph of the comparison concept. The subset may be determined based on a frequency of predicates found for the concept.

For each respective predicate in the subset the method may include selecting a similarity algorithm (e.g., based on a lookup table that matches a type of the predicate to an algorithm) and executing the similarity algorithm using the value of the respective predicate for the search concept compared with the value of the respective predicate for the comparison concept. For example, wherein the respective predicate is a name, the similarity algorithm may be is a string similarity algorithm (e.g., Levenshtein Distance). In another example, when the respective predicate is an address the similarity algorithm may be a distance comparison algorithm (e.g., using geo-coordinates). The method may further include receiving an output value of the similarity algorithm for the respective predicate and presenting the value of the respective predicate for the search concept, the value of the respective predicate for the comparison concept, and the output value. In various examples, predicate comparison visualization is formatted as a graph, wherein the search concept is represented as a first node and the comparison concept is presented as a second node (such as in FIG. 4). In other examples, the predicate comparison visualization is formatted as a table wherein a row in the table is formatted according to the output value.

Figure 6:
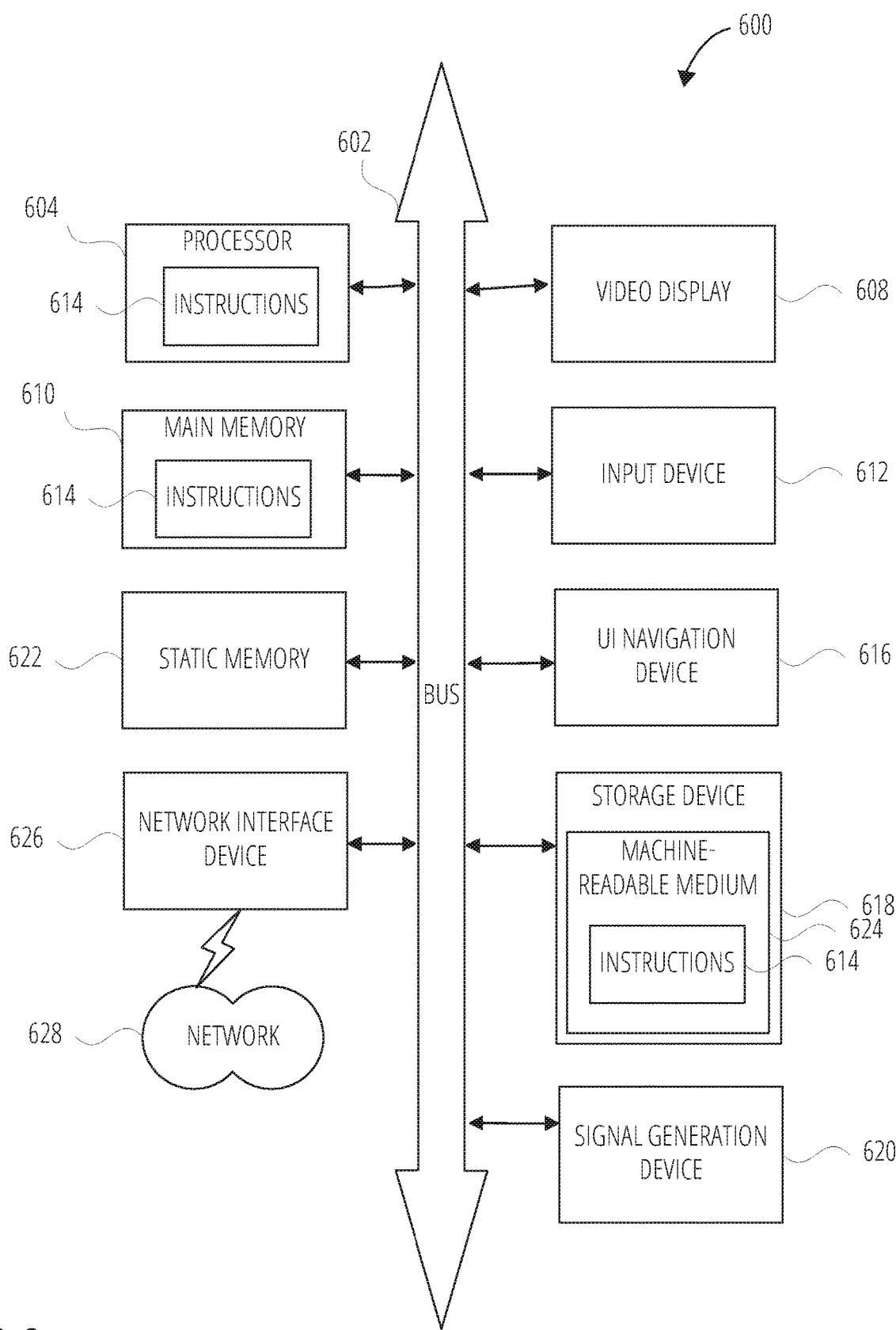
FIG. 6 is a block diagram illustrating a machine in the example form of computer system, within which a set or sequence of instructions may be executed to cause the machine to perform any one of the methodologies discussed herein, according to various examples.

FIG. 6 is a block diagram illustrating a machine in the example form of computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 604 (e.g., a central processing unit (CPU), a graphics processing unit (GPU) or both, processor cores, compute nodes, etc.), a main memory 610 and a static memory 622, which communicate with each other via a bus 602. The computer system 600 may further include a video display 608, an input device 612 (e.g., a keyboard), and a user interface (UI) UI navigation device 616 (e.g., a mouse). In one embodiment, the video display 608, input device 612, and UI navigation device 616 are incorporated into a single device housing such as a touch screen display. The computer system 600 may additionally include a storage device 618 (e.g., a drive unit), a signal generation device 620 (e.g., a speaker), a network interface device 626, and one or more sensors (not shown), such as a global positioning system (GPS) sensor, compass, accelerometer, or other sensors.

The storage device 618 includes a machine-readable medium 624 on which is stored one or more sets of data structures and instructions 614 (e.g., software) embodying or utilized by any one or more of the methodologies or functions described herein. The instructions 614 may also reside, completely or at least partially, within the main memory 610, static memory 622, and/or within the processor 604 during execution thereof by the computer system 600, with the main memory 610, static memory 622, and the processor 604 also constituting machine-readable media.

While the machine-readable medium 624 is illustrated in an example embodiment to be a single medium, the term "machine-readable medium" may include a single medium or multiple media (e.g., a centralized or distributed Database, and/or associated caches and servers) that store the one or more instructions 614. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 624 that excluded transitory signals.

The instructions 614 may further be transmitted or received over a communications network 628 using a transmission medium via the network interface device 626 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software

What is claimed is:

1. A method comprising:
   presenting a user interface on a computing device, the user interface including:
      an input element configured to receive an input of a search concept;
      a similar concept selection element; and
      a concept comparison portion;
   executing a similarity search in a vector-space representation of a knowledge graph using the input, the knowledge graph storing subject, object, predicate triples;
   populating the similar concept selection element with a set of a similar concepts based on a result of the executed similarity search, the set of similar concepts corresponding to a set of subjects in the knowledge graph;
   receiving a selection of a comparison concept of the set of similar concepts from the similar concept selection element;
   generating a predicate comparison visualization in the concept comparison portion based on predicates of the triples stored in the knowledge graph of the comparison concept and the search concept, wherein generating the predicate comparison visualization includes:
      retrieving values of a subset of the predicates in the knowledge graph from triples stored in the knowledge graph of the search concept;
      retrieving values of the subset of the predicates in the knowledge graph from triples stored in the knowledge graph of the comparison concept; and
      for each respective predicate in the subset of the predicates:
         selecting a similarity algorithm;
         executing the similarity algorithm using the value of the respective predicate for the search concept compared with the value of the respective predicate for the comparison concept as inputs to the similarity algorithm;
         receiving an output value of the similarity algorithm for the respective predicate; and
         adding the value of the respective predicate for the comparison concept, the output value to the predicate comparison visualization, and the output value of the similarity algorithm to the predicate comparison visualization; and presenting the predicate comparison visualization in the concept comparison portion.

2. The method of claim 1, wherein selecting the similarity algorithm includes:
   selecting the similarity algorithm based on a type of the respective predicate.

3. The method of claim 2, wherein the respective predicate is a name and the similarity algorithm is a string similarity algorithm that performs a string compare on the value of the respective predicate for the search concept compared with the value of the respective predicate for the comparison concept.

4. The method of claim 2, wherein the respective predicate is an address and the similarity algorithm is a distance comparison algorithm.

5. The method of claim 1, wherein the predicate comparison visualization is formatted as a table.

6. The method of claim 5, wherein a row in the table is formatted according to the output value.

7. The method of claim 1, wherein the predicate comparison visualization is formatted as a graph, wherein the search concept is represented as a first node and the comparison concept is presented as a second node.

8. The method of claim 1, wherein a degree of similarity is presented with each concept in the set of similar concepts in the similar concept selection element.

9. A non-transitory computer-readable medium comprising instructions, which when executed by at least one processor, configure the at least one processor to perform operations comprising:
   presenting a user interface on a computing device, the user interface including:
     an input element configured to receive an input of a search concept;
     a similar concept selection element; and
     a concept comparison portion;
   executing a similarity search in a vector-space representation of a knowledge graph using the input, the knowledge graph storing subject, object, predicate triples;
   populating the similar concept selection element with a set of a similar concepts based on a result of the executed similarity search, the set of similar concepts corresponding to a set of subjects in the knowledge graph;
   receiving a selection of a comparison concept of the set of similar concepts from the similar concept selection element;
   generating a predicate comparison visualization in the concept comparison portion based on predicates of the triples stored in the knowledge graph of the comparison concept and the search concept, wherein generating the predicate comparison visualization includes:
     retrieving values of a subset of the predicates in the knowledge graph from triples stored in the knowledge graph of the search concept;
     retrieving values of the subset of the predicates in the knowledge graph from triples stored in the knowledge graph of the comparison concept; and
     for each respective predicate in the subset of the predicates:
       selecting a similarity algorithm;
       executing the similarity algorithm using the value of the respective predicate for the search concept compared with the value of the respective predicate for the comparison concept as inputs to the similarity algorithm;
       receiving an output value of the similarity algorithm for the respective predicate; and
       adding the value of the respective predicate for the comparison concept, the output value to the predicate comparison visualization, and the output value of the similarity algorithm to the predicate comparison visualization; and
   presenting the predicate comparison visualization in the concept comparison portion.

10. The non-transitory computer-readable medium of claim 9, wherein the operation of selecting the similarity algorithm includes:
    selecting the similarity algorithm based on a type of the respective predicate.

11. The non-transitory computer-readable medium of claim 10, wherein the respective predicate is a name and the similarity algorithm is a string similarity algorithm that performs a string compare on the value of the respective predicate for the search concept compared with the value of the respective predicate for the comparison concept.

12. The non-transitory computer-readable medium of claim 10, wherein the respective predicate is an address and the similarity algorithm is a distance comparison algorithm.

13. The non-transitory computer-readable medium of claim 9, wherein the predicate comparison visualization is formatted as a table.

14. The non-transitory computer-readable medium of claim 13, wherein a row in the table is formatted according to the output value.

15. The non-transitory computer-readable medium of claim 9, wherein the predicate comparison visualization is formatted as a graph, wherein the search concept is represented as a first node and the comparison concept is presented as a second node.

16. The non-transitory computer-readable medium of claim 9, wherein a degree of similarity is presented with each concept in the set of similar concepts in the similar concept selection element.

17. A system comprising:
    at least one processor; and
    a storage device comprising instructions, which when executed by the at least one processor, configure the at least one processor to perform operations comprising:
      presenting a user interface on a computing device, the user interface including:
        an input element configured to receive an input of a search concept;
        a similar concept selection element; and
        a concept comparison portion;
      executing a similarity search in a vector-space representation of a knowledge graph using the input, the knowledge graph storing subject, object, predicate triples;
      populating the similar concept selection element with a set of a similar concepts based on a result of the executed similarity search, the set of similar concepts corresponding to a set of subjects in the knowledge graph;
      receiving a selection of a comparison concept of the set of similar concepts from the similar concept selection element;
      generating a predicate comparison visualization in the concept comparison portion based on predicates of the triples stored in the knowledge graph of the comparison concept and the search concept, wherein generating the predicate comparison visualization includes:

retrieving values of a subset of the predicates in the knowledge graph from triples stored in the knowledge graph of the search concept;

retrieving values of the subset of the predicates in the knowledge graph from triples stored in the knowledge graph of the comparison concept; and for each respective predicate in the subset of the predicates:

selecting a similarity algorithm;

executing the similarity algorithm using the value of the respective predicate for the search concept compared with the value of the respective predicate for the comparison concept as inputs to the similarity algorithm;

receiving an output value of the similarity algorithm for the respective predicate; and adding the value of the respective predicate for the comparison concept, the output value to the predicate comparison visualization, and the output value of the similarity algorithm to the predicate comparison visualization; and presenting the predicate comparison visualization in the concept comparison portion.

* * * * *